Figure 1:
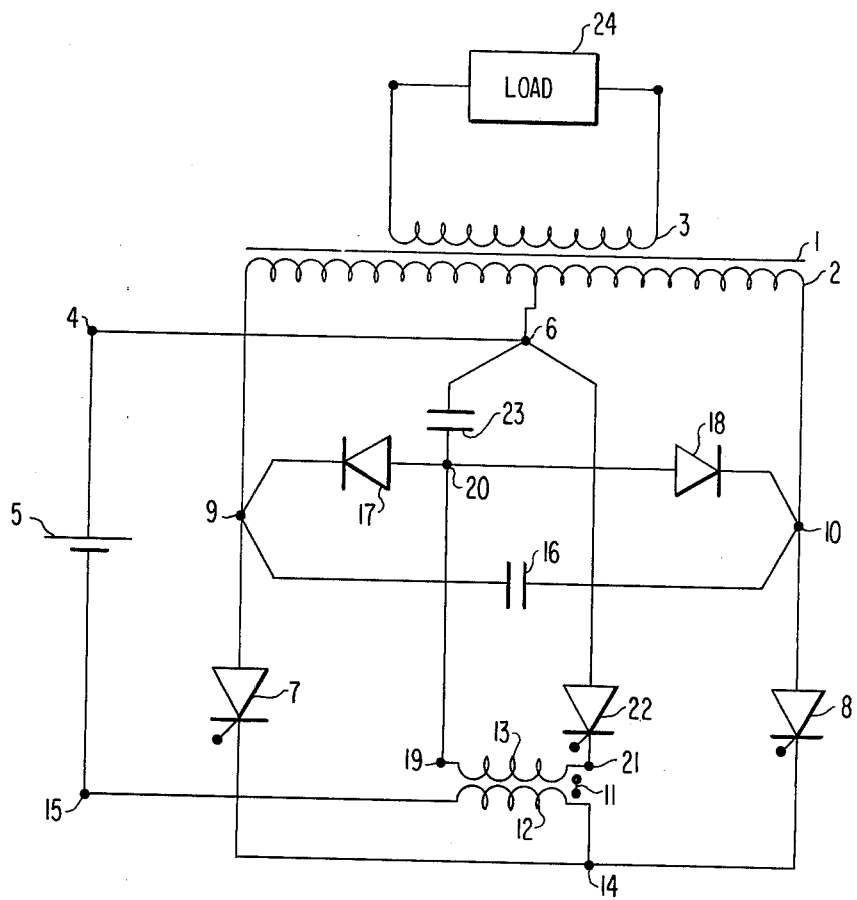

United States Patent
Rao et al.

[11] 3,916,290
[45] Oct. 28, 1975

[54] PARALLEL INVERTERS

[76] Inventors: Hattangady Vasanth Rao; Ravindra Nath Doss, both of Telecomm. Research Centre, Khurshid Lal Bhavan, Janpath-New Dehli-1, India

[22] Filed: Sept. 27, 1974

[21] Appl. No.: 510,098

[52] U.S. Cl. .............................. 321/45 R; 321/45 C
[51] Int. Cl.² ................ H02M 7/515; H02M 7/505
[58] Field of Search ................ 321/36, 45 R, 45 C; 307/252 M

[56] References Cited
UNITED STATES PATENTS

| | | | |
|---|---|---|---|
| 3,075,136 | 1/1963 | Jones | 321/45 R |
| 3,259,827 | 7/1966 | Strohmeier et al. | 321/45 R X |
| 3,263,153 | 7/1966 | Lawn | 321/45 C |
| 3,303,406 | 2/1967 | Bedford | 321/45 R X |
| 3,349,312 | 10/1967 | Bergman | 321/45 R X |
| 3,349,314 | 10/1967 | Giannamore | 321/45 C |
| 3,378,752 | 4/1968 | Naylor | 321/45 R X |

FOREIGN PATENTS OR APPLICATIONS

| | | | |
|---|---|---|---|
| 262,249 | 11/1970 | U.S.S.R. | 321/45 R |

*Primary Examiner*—William M. Shoop
*Attorney, Agent, or Firm*—Sughrue, Rothwell, Mion, Zinn & Macpeak

[57] ABSTRACT

In a parallel inverter having a transformer with centre-tapped primary winding, an auxiliary thyristor is connected via the commutating inductor between the centre-tap and the junction of two series connected diodes bridged across the primary winding. A second winding on the commutating inductor inductively coupled to the first is inserted in series with a D.C. source.

4 Claims, 6 Drawing Figures

PARALLEL INVERTERS

This invention relates to inverters and more particularly to an improved arrangement of a parallel inverter.

In prior art parallel inverter circuits employing thyristors as switching elements, the regulation of output power has been achieved by means of pulse width control. This implies that each main thyristor of the parallel inverter conducts only for a portion of the half cycle and the output power is regulated by controlling the conduction time of the main thyristors. It further implies that in each half cycle there is an interval of time when both the main thyristors are off, and that during this interval the primary winding of the inverter transformer is virtually open circuited.

In most practical applications the load on the inverter stage has reactive elements — for instance, when a filter follows the inverter stage for deriving sine wave output. Necessity, therefore, exists for providing a return path through the inverter for any reactive current that may continue to flow when both the main thyristors are off. Prior art parallel inverter circuits envisage two possible methods for providing this return path; namely, by increasing the value of the commutating capacitor connected across the transformer winding so as to absorb the load current for the required duration, or by means of feedback diodes connected on the primary side of the transformer in inverse relation with each main thyristor. The first method has serious drawbacks. The value of capacitance required in most practical applications is so large as to make the inverter very expensive. Further, this heavy capacitor draws a large reactive current adding considerably to the power losses in the inverter and adversely affecting its efficiency. The second method also has drawbacks. The return path through feedback diodes includes the D.C. source within it and this involves cyclic exchange of energy between the load and the D.C. source necessitating increased current rating for the transformer windings and thyristors. Further, when either feedback diode conducts in the process of carrying the return current, it places the D.C. source across the primary winding of the inverter transformer. As a result, the waveform of the output voltage across the secondary winding remains virtually a square wave. Therefore, this method fails to provide control over the pulse width of the output voltage (as distinct from output power) and consequently over the harmonic content of the output.

With a view to overcome the drawbacks mentioned above, we had proposed in our prior U.S. Pat. Application Ser. No. 348,354 of April 5, 1973, now U.S. Patent No. 3,891,913, an inverter comprising a transformer with a commutating capacitor connected across its centre-tapped primary, a second commutating capacitor is connected in series with the first, an additional centre tapped auxiliary winding is provided on the transformer, and an auxiliary thyristor is provided between the junction of the said capacitors and the junction of the main thyristor of the inverter. This is open to the objection that it involves provision of an auxiliary winding, adding to the size and cost of the inverter transformer. The object of the present invention is to develop an inverter which will enable the auxiliary winding to be eliminated from the transformer without affecting the performance and advantages achieved in the earlier inverter.

We have found i. that the primary winding itself can be made to carry out the functions of the auxiliary winding, thus eliminating the auxiliary winding from the transformer,
ii. that this can be achieved by provision of an auxiliary thyristor in a parallel inverter in conjunction with a pair of series connected diodes and an additional commutating capacitor,
iii. that (i) and (ii) above enable
   a. control of the output power as also control of the pulse width of the output voltage thereby providing within the parallel inverter a means for regulating the output power or voltage or current or harmonic content by varying the pulse width,
   b. provision within the parallel inverter of an alternative low impedance return path for flow of reactive current associated with the load during the interval when both main thyristors of the inverter are off such that this path does not include the D.C. source within it, and there is no cyclic exchange of energy between the load and the D.C. source,
   c. smooth transfer of reflected load current from the main thyristors to the alternative low impedance path or vice-versa without giving rise to abrupt impedance changes and voltage or current spikes,
   d. use of the alternative low impedance return path sent up within the inverter to clamp the magnetic flux in the transformer core so as to permit full swing of the flux density between the maximum operating limit for a wide range of operating conditions, particularly the input D.C. voltage.

According to the present invention, there is provided a parallel inverter comprising a transformer having a primary and a secondary winding, said primary winding split into two equal portions, these two portions having a common centre-tap, a D.C. source having a live terminal and a return terminal, the live terminal connected to the centre-tap of the said primary winding, a pair of series connected first and second thyristors having their like terminals joined together and their remaining terminals connected across the said primary winding, a commutating inductor having a first winding and a second winding, the two windings inductively coupled to each other and the first winding connected between the junction of the said first and second thyristors and the return terminal of the said D.C. source, a main commutating capacitor connected across the said primary winding characterised in that a pair of series connected diodes having their like terminals joined together is connected across the said primary winding, a third thyristor is connected between the centre-tap of the said primary winding and the junction of the said diodes via the second winding of the said commutating inductor, and a second commutating capacitor is connected between the centre-tap of the said primary winding and the junction of the said diodes. In an inverter as aforesaid, the first or second thyristor, when turned on, commutates the third thyristor and delivers an output voltage pulse across the secondary winding, the third thyristor when turned on commutates the first or second thyristor, provides an alternative low impedance return path through the inverter for flow of reactive current, and clamps the output voltage to zero and the magnetic flux in the transformer to the pre-commutation level, thereby achieving, without the use of an auxiliary winding on the transformer, effective utilisation of the transformer core and effective regulation of the output power or voltage or current or harmonic content.

The main commutating capacitor may be made of a series combination of two capacitors each connected across each half portion of the primary winding. The main commutating capacitor may be connected across taps on the primary winding, the turns ratio between the taps and the primary winding being either higher or lower than unity.

Figure 2:
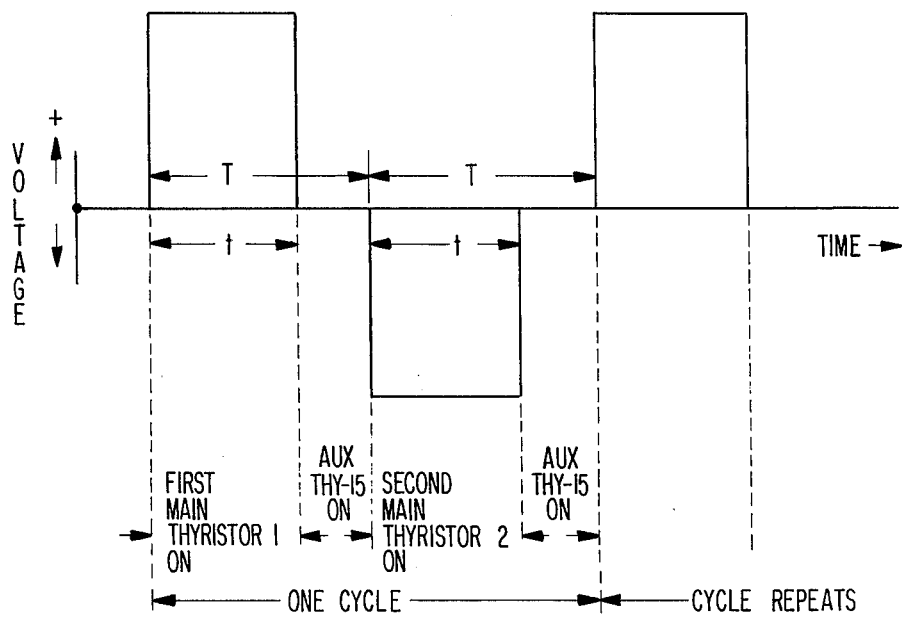
Figure 3:
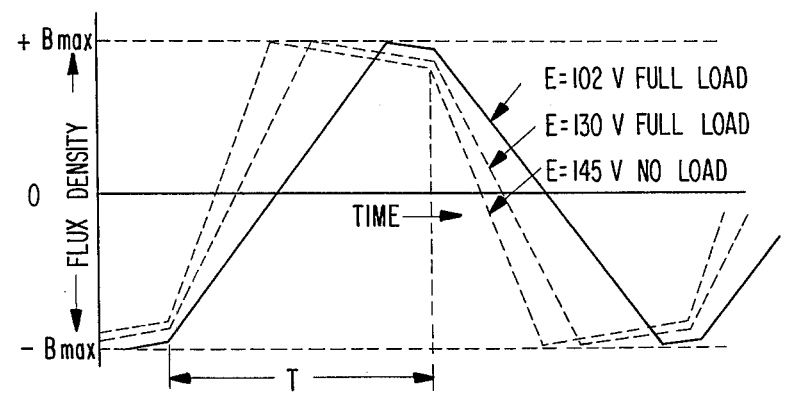
Figure 4:
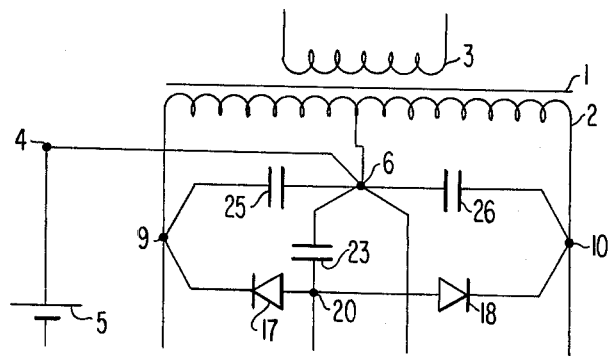
Figure 5:
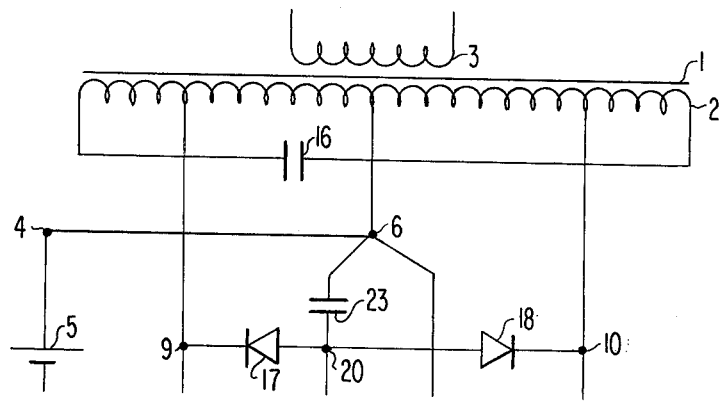
Figure 6:
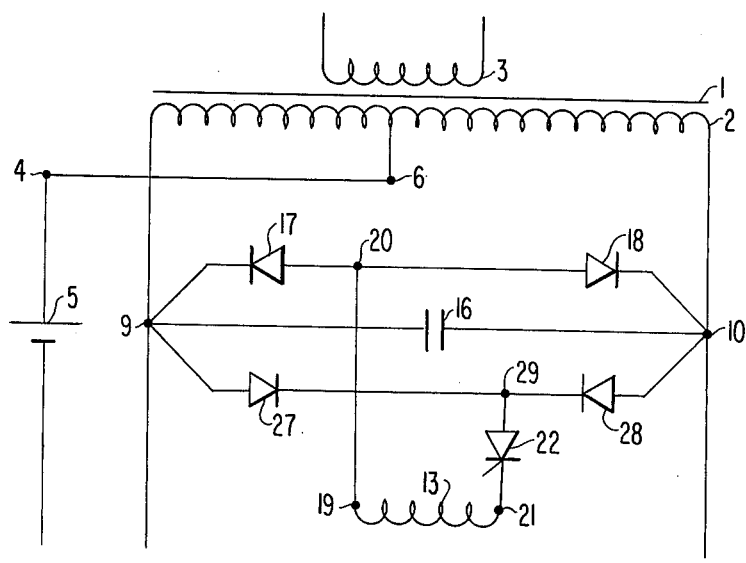

The invention will now be described with the help of the accompanying drawings wherein FIG. 1 is a circuit diagram illustrating one embodiment of the present invention, FIG. 2 shows the typical waveform of the output voltage of the present invention, FIG. 3 shows the typical waveform of the flux density in the transformer core with variations in D.C. input voltage, and FIGS. 4 to 6 show alternative arrangements for connecting the main commutating capacitor or auxiliary thyristor.

Having more specific reference now to the inverter configuration illustrated in FIG. 1, it will be seen that this inverter comprises a transformer 1 having a centre-tapped primary winding 2 and a secondary winding 3. The live terminal 4 of a D.C. source 5 is connected to the centre-tap 6 of the primary winding 2. A pair of series connected thyristors 7, 8 (to be designated main thyristors) having their like terminals joined together is connected across the outer ends 9, 10 of the primary winding 2. A commutating inductor 11 made up of a first winding 12 and a second winding 13, the two windings inductively coupled to each other, has its first winding 12 connected between the junction 14 of the thyristors 7, 8 and the return terminal 15 of the D.C. source 5. A main commutating capacitor 16 is connected across the outer ends 9, 10 of the primary winding 2. A pair of series connected diodes 17, 18 having their like terminals joined together is connected between the outer ends 9, 10 of the primary winding 2. One end 19 of the second winding 13 of the commutating inductor 11 is connected to the junction 20 of the diodes 17, 18. The other end 21 of this second winding 13 is connected to centre-tap 6 of the primary winding 2 through an auxiliary thyristor 22. A second commutating capacitor 23 is connected between the junction 20 of diodes 17, 18 and the centre-tap 6 of the primary winding 2. The gates and cathodes of the thyristors 7, 8, 22 are connected to a control circuit which is not shown in FIG. 1, and which employs known methods for turning on any of the three thyristors. The load 24 is connected across the secondary winding 3.

Such a circuit arrangement as described above enables either main thyristor 7 or 8 to be turned off by turning on the auxiliary thyristor 22 by means of the control circuit. It also enables turning off of the auxiliary thyristor 22 by turning on either main thyristor 7 or 8 by means of the control circuit. Control of the conduction period of the main thyristors 7, 8 is achieved by controlling the instant of turning on of the auxiliary thyristor 22 with reference to the instants of turning on of the main thyristors. Control of the conduction period of the main thyristors enables regulation of the output power, voltage or current. The auxiliary thyristor 22 remains off when either main thyristor 7 or 8 is conducting. During the interval when both main thyristors 7, 8 are off auxiliary thyristor 22 remains conducting and provides a low impedance return path for the reactive current associated with the load via the second winding 13 of the commutating inductor 11, either diode 17 or 18 and either half of the primary winding 2. This return path has a low impedance and does not include the D.C. source 5 within it. Negligible voltage is, therefore, developed by any reflected load current flowing through it. Consequently, the output voltage across the secondary winding 3 remains virtually zero during the interval when both main thyristors 7, 8 are off as illustrated in FIG. 2. Owing to this feature, the harmonic content in the output is a direct function of the width of the output voltage pulses. Controlling the width of the output voltage pulses by controlling the conduction period of the main thyristors 7, 8 enables regulation of the harmonic content in the output in addition to the power or voltage or current. Coupling provided through inductor 11 between reflected load current path via primary winding 2 and either main thyristor 7 or 8 and the alternative low impedance path via diode 17 or 18 and auxiliary thyristor 22 together with buffer action of the commutating capacitors during commutation interval facilitates a smooth transfer of the reflected load current from one path to the other without giving rise to abrupt impedance changes. The low impedance path provided through the auxiliary thyristor 22 during the interval when it conducts amounts to a virtual short circuit of the primary winding and it clamps the voltage across the primary as well as secondary windings to virtually zero. This in turn clamps for the duration of the short circuit the flux in the core of transformer 1 to the level it reaches at the instant of commutation of either main thyristor 7 or 8. Clamping of the flux in this manner in conjunction with control of the conduction period of the main thyristors 7, 8 enables maximum operating flux density swing for a wide range of starting and operating conditions of the inverter. FIG. 3 illustrates this for a typical case of D.C. source voltage variations.

The inverter circuit as described above and illustrated in FIG. 1 operates in the following manner:

At the commencement of the first half cycle, one of the two main thyristors, say 7, is turned on by applying to its gate a current pulse from the control circuit. This thyristor, on turning on, applies pole 15 of the D.C. source 5 to the outer end 9 of the primary winding 2 of the transformer 1 while the other pole 4 of the said D.C. source remains connected to the centre-tap 6 of the said primary winding resulting in a. induction of a voltage in one direction across the secondary winding 3, b. flow of current into load 24 as a result of voltage impressed across it by the secondary winding 3 and consequent flow of reflected load current from the D.C. source 5 into one half of the primary winding 2, thyristor 7 and winding 12 of inductor 11, c. charging of the commutating capacitors 16, 23 by the action of the D.C. source voltage impressed across these, positive polarity of the charges being at terminals 10 and 6 respectively.

At the end of time interval 't' from the turning on of the main thyristor 7, which time interval corresponds to the conduction period required for the main thyristor 7, the auxiliary thyristor 22 is turned on by means of a current pulse applied to its gate from control circuit resulting in a. application of the charge on the commutating capacitors via windings 13, 12 of inductor 11 as a reverse voltage across thyristor 7 so as to turn it off,
b. decay of voltage across commutating capacitors 16, 23 which electrically appear as a parallel combination, on account of supply of commutation current pulse via thyristor 22 and winding 13 and support of reflected load current in the primary winding 2 during the commutation interval,
c. decay of voltage across the primary winding 2 and across the secondary winding 3 consequent on decay of capacitor voltages mentioned at (b) above,
d. setting up of alternative low impedance path through one half of the primary winding 2, auxiliary thyristor 22, inductor winding 13, and diode 17 or 18, which low impedance path does not contain the D.C. source 5,
e. transfer of reflected load current from the commutating capacitor buffer path to the alternative low impedance path mentioned at (d) above,
f. clamping of the magnetic flux in the core of transformer 1 by virtue of a virtual short circuit applied by auxiliary thyristor 22 across the primary winding 2 as a result of which the flux density level reached at the instant of commutation of main thyristor 7 is maintained till the commencement of the second half cycle.

Thus, at the end of this commutation interval, the voltage across each transformer winding is nearly zero, the reflected load current is established through the alternative low impedance path and the voltage across the two capacitors is nearly zero.

After a specified interval of time 'T' which is greater than $t$ and which corresponds to half period of the A.C. output required, the main thyristor 8 is turned on by applying to its gate a pulse of current from the control circuit resulting in a. application of the D.C. source voltage via windings 12, 13 of inductor 11 as a reverse voltage across auxiliary thyristor 22 thereby turning it off,
b. transfer of reflected load current from the alternative low impedance path to the primary winding path via thyristor 8,
c. removal of short circuit across the primary winding 2, permitting the flux in the core of the transformer 1 to change under the action of the D.C. source voltage applied to the other half of the primary winding 2,
d. rise of voltage across the parallel combination of commutating capacitors as they get charged under the action of the applied D.C. source voltage and consequent rise of voltage across primary winding 2 in the other direction,
e. induction of a voltage in the other direction in the secondary winding 3 and its application across load 24.

Thus, at the end of this commutation interval, the load receives the negative pulse of output voltage, the reflected load current is established through the main thyristor 8 path and the commutating capacitors are in readiness to turn off the main thyristor 8 when required.

The auxiliary thyristor 22 is turned on after an interval of time $t$ from the turning on of the main thyristor 8 resulting in turning off of the main thyristor 8 and the repetition of the cycle of events as mentioned above for the main thyristor 7.

The sequence of events described above comprises one cycle and is repeated at intervals of time '2T' thereby producing in the secondary winding 3 of the transformer 1 a stepped square wave of alternating voltage having the waveform shown in FIG. 2 whose frequency is governed by the time interval T set by the control circuit and whose pulse width can be controlled by varying the time interval $t$ by means of the control circuit. For such a waveform of output voltage, control of time interval $t$ enables regulation of output power, or voltage or current or harmonic content.

While FIG. 1 illustrates one embodiment of this invention, the invention itself is not limited to such an embodiment. Modifications may be made, for instance, to permit a reversal of the positive and negative terminals of the D.C. source, to permit location of the commutating inductor in another part of the circuit, to return the auxiliary thyristor to the outer ends of the primary winding via diodes instead of to the centre tap, to permit connection of commutating capacitors across each half of the primary winding or across taps on the primary winding and so on. FIG. 4 shows the relevant portion of the circuit for illustrating one alternative method of connecting the main commutating capacitor wherein it is made up of a series combination of two capacitors 25 and 26 each connected across each half of the primary winding 2. Electrically this combination is equivalent to and functions in a similar manner as capacitor 16 of FIG. 1. This arrangement is useful when the D.C. source voltage is comparatively high. FIG. 5 shows the relevant portion of the circuit for illustrating another alternative method of connecting the main commutating capacitor wherein it is connected across taps on the primary winding, the turns ratio between the taps and the primary winding being either higher or lower than unity. This arrangement is also electrically equivalent to the capacitor 16 of FIG. 1 (allowing for step up or step down ratio) and is useful in matching the capacitor voltage rating to the D.C. source voltage.

FIG. 6 illustrates an alternative method of connecting the auxiliary thyristor wherein it is returned to the outer ends of the primary winding via diodes 27, 28 instead of to the centre tap 6. Diodes 27, 28 act in conjunction with diodes 17, 18 as a full wave bridge across the primary winding, which is electrically equivalent to and functions in a similar manner as the centre tapped arrangement. This arrangement has the advantage that the full primary winding provides the return path.

It will be seen from the foregoing description of the inverter circuit and its operation that apart from advantages normally achievable from prior art methods of pulse width control of output power, this invention has the following advantages:

a. The inverter lends itself to operation with any desired width of the output voltage pulse and this pulse width can be chosen to be in the region of minimum harmonic distortion or for elimination of any desired harmonic. For instance, for 120° conduction, the third harmonic is zero. This feature is of particular significance when the inverter is required to deliver a sine wave output since the operating range of pulse width can be chosen for a minimum burden on the sine wave filter.

b. Clamping of flux in the transformer core permits effective and full utilisation of the transformer core under a wide range of starting and operating conditions of the inverter. This feature is of particular significance when a secondary battery is used as the D.C. source and its voltage varies over a wide range (such is often the case in practice). This is illustrated in FIG. 3 for a battery voltage range of 120 volts to 145 volts. The equivalent transformer KVA rating is governed in such cases by the minimum voltage of the D.C. source and not by the maximum voltage as would be the case in prior art circuits.

c. Method of handling reactive current as proposed in this invention does not involve cyclic exchange of energy between the load and the D.C. source. The D.C. source delivers to the load just the amount of energy necessary to maintain the voltage or current level required and this energy is circulated within the load itself through the low impedance return path of the inverter during the interval when both main thyristors are off. This enables reduced current rating for the transformer windings and the main thyristors.

What we claim is:

1. A parallel inverter comprising:
   a transformer having a primary and a secondary winding, said primary winding split into two equal portions, these two portions having a common centre-tap,
   a D.C. source having a live terminal and a return terminal, the live terminal connected to the centre-tap of the said primary winding,
   a pair of series connected first and second thyristors having their like terminals joined together and their remaining terminals connected across the said primary winding,
   a commutating inductor having a first winding and a second winding, the two windings inductively coupled to each other and the first winding connected between the junction of the said first and second thyristors and the return terminal of the said D.C. source,
   a main commutating capacitor connected across the said primary winding characterised in that a pair of series connected diodes having their like terminals joined together is connected across the said primary winding,
   a third thyristor is connected between the centre-tap of the said primary winding and the junction of the said diodes via the second winding of the said commutating inductor, and
   a second commutating capacitor is connected between the centre-tap of the said primary winding and the junction of the said diodes.

2. A parallel inverter as claimed in claim 1 wherein the main commutating capacitor is made up of a series combination of two capacitors, each connected across each half portion of the primary winding.

3. A parallel inverter as claimed in claim 1 wherein the main commutating capacitor is connected across taps on the primary winding, the turns ratio between the taps and the primary winding being either higher or lower than unity.

4. A parallel inverter as claimed in claim 1 wherein the third thyristor is connected via the second winding of the commutating inductor between the junction of the said diodes and the junction of a second pair of series connected diodes having their like terminals joined together and the remaining terminals connected across the primary winding.

* * * * *